(12) United States Patent
Upadhyaya

(10) Patent No.: US 11,349,381 B2
(45) Date of Patent: May 31, 2022

(54) PHASE REDUNDANT POWER SUPPLY WITH ORING FET CURRENT SENSING

(71) Applicant: Alpha and Omega Semiconductor International LP, Sunnyvale, CA (US)

(72) Inventor: Prabal Upadhyaya, San Jose, CA (US)

(73) Assignee: Alpha and Omega Semiconductor International LP, Toronto (CA)

( * ) Notice: Subject to any disclaimer, the term of this patent is extended or adjusted under 35 U.S.C. 154(b) by 63 days.

(21) Appl. No.: 16/917,649

(22) Filed: Jun. 30, 2020

(65) Prior Publication Data

US 2021/0408911 A1 Dec. 30, 2021

(51) Int. Cl.
*H02M 3/158* (2006.01)
*H02M 1/00* (2006.01)

(52) U.S. Cl.
CPC ....... *H02M 1/0009* (2021.05); *H02M 3/1584* (2013.01); *H02M 3/1586* (2021.05)

(58) Field of Classification Search
CPC ....... H02M 1/0009; H02M 3/156; H02M 1/08
See application file for complete search history.

(56) References Cited

U.S. PATENT DOCUMENTS

| 9,712,080 | B2 | 7/2017 | Phadke | |
| 10,530,257 | B1* | 1/2020 | Egan | H02M 3/1584 |
| 2006/0061340 | A1* | 3/2006 | Wang | H02M 3/156 323/267 |
| 2013/0163297 | A1 | 6/2013 | Phadke et al. | |
| 2014/0118413 | A1* | 5/2014 | Park | H03K 17/122 345/690 |
| 2014/0167721 | A1* | 6/2014 | Ito | H02M 1/08 323/282 |
| 2015/0364998 | A1* | 12/2015 | North | H02M 3/1588 323/271 |

* cited by examiner

*Primary Examiner* — Alex Torres-Rivera

(57) ABSTRACT

A power stage in a multi-phase switching power supply incorporates a current sense transistor coupled in series with the output inductor to sense the phase current for the power stage. In some embodiments, the current sense transistor mirrors the output voltage disconnect transistor (the ORing FET) used to switchably connect a power stage to the output voltage node. The current sense transistor measures a portion of the inductor current flowing through the output inductor where the inductor current is indicative of the phase current of the power stage. Accurate current sensing is implemented for the power stage where the current sense value dose not require temperature compensation.

17 Claims, 7 Drawing Sheets

PHASE REDUNDANT POWER SUPPLY WITH ORING FET CURRENT SENSING

FIELD OF THE INVENTION

The invention relates to phase redundant power supply system and, in particular, to current sensing in a phase redundant power supply system.

BACKGROUND OF THE INVENTION

Electronic systems, such as laptop computers, typically include power management integrated circuits for regulating the power usage of the electronic systems. Furthermore, electronic systems incorporating integrated circuits typically employ voltage regulators to convert a main bus voltage from a power source supplying the system to one or more voltages necessary for driving the integrated circuits therein. For example, a 12 volts supply voltage provided to an electronic system may need to be reduced to 1.8 volts to drive an integrated circuit in the electronic system. In another example, modern server systems include processors and local memory coupled to components and executing embedded software to perform certain tasks. In practice, the processor power supply is provided by a voltage regulator converting an input voltage from a power source (e.g. 12V) to a voltage value specified for the processor (e.g. 1.0V).

Switch mode power supplies or switching regulators, also referred to as DC to DC converters, are a type of voltage regulators often used to convert an input supply voltage to a desired output voltage at a voltage level selected for an integrated circuit. In one example, a 12V or 5V supply voltage may be reduced to 1V for supplying an embedded processor. A switching regulator provides power supply function through low loss components such as capacitors, inductors, and transformers, and power switches that are turned on and off to transfer energy from the input to the output in discrete packets. A feedback control circuit is used to regulate the energy transfer to maintain a constant output voltage within the desired load limits of the circuit.

Some switching regulators employ pulse width modulation (PWM) to control the duty cycle of the power switches. That is, the on-time of power switches may be controlled at a given fixed or variable frequency by adjusting the pulse width. Switching regulators employing PWM control include a PWM controller or modulator to drive a power block including the power switches, the driver circuit for the power switches and the LC filter circuit. In some cases, the switching regulator is a single phase converter and the PWM controller generates a single phase PWM clock signal to drive a single phase power block. In other cases, the switching regulator is a multi-phase converter and a multi-phase PWM controller generates clock signals with different phase shifts to drive a multi-phase power block, each clock signal driving a respective power block cell. Multi-phase PWM controllers are desirable when the voltage regulator has to deliver a regulated output voltage with high precision over a wide range of load conditions.

In an electronic system incorporating a voltage regulator, it is often necessary to measure the output current or load current of the voltage regulator to implement power management functions. In a multi-phase converter, it is sometimes necessary to measure the load current at each power block cell associated with each clock phase, such as to determine the load balancing between the power block cells.

Modern server systems often demand high level of availability and protection from system failures, such as power loss. To ensure system reliability, modern server systems sometimes implement redundant server systems where a redundant server is provided to replace another server detected to be down. Because the redundant server has to have the same computing power as the primary server, providing redundant servers increases space and cost concerns.

In practice, power supplies are often the point of failures on server systems. As a result, redundancy power supply has been implemented in server systems since a redundant power supply often can be implemented at lower cost and less space than a redundant server system. In server systems using multi-phase power supplies, N+2 phase redundant solutions are becoming popular. That is, the multi-phase power supply includes the N phase necessary to supply the power demand of the server system plus two more phases as redundancy. In the event one of the operating phases failed, the failed phase will simply be isolated from the system in such a way that the rest of the phases in the multi-phase power supply continues to provide power uninterrupted.

BRIEF DESCRIPTION OF THE DRAWINGS

Various embodiments of the invention are disclosed in the following detailed description and the accompanying drawings.

FIG. 7, which includes

DETAILED DESCRIPTION

According to embodiments of the present invention, a multi-phase switching power supply implementing phase redundant scheme include incorporates a current sense transistor coupled in series with the output inductor in each power stage to sense the phase current for each power stage. In some embodiments, the current sense transistor is a field effect transistor that mirrors the output voltage disconnect transistor, referred to as the ORing field effect transistor, or "ORing FET", used to disconnect a failed power stage from the remaining power stages in the multi-phase switching power supply. Current through the current sense transistor is equal to the current through the ORing FET times the width ratio of the two transistors. The current sense transistor measures a portion of the inductor current flowing through the output inductor in the LC filter circuit of each power stage, where the inductor current is indicative of the load current of the power stage. In this manner, accurate current sensing is implemented for each power stage where the current sense value does not require temperature compensation.

In an alternate embodiment of the present disclosure, phase current sensing in a power stage of a multi-phase switching power supply is implemented by monitoring the On resistance RDSON of the ORing FET. Temperature compensation techniques can be applied to compensate for temperature coefficient in the current sense measurements.

Figure 1:
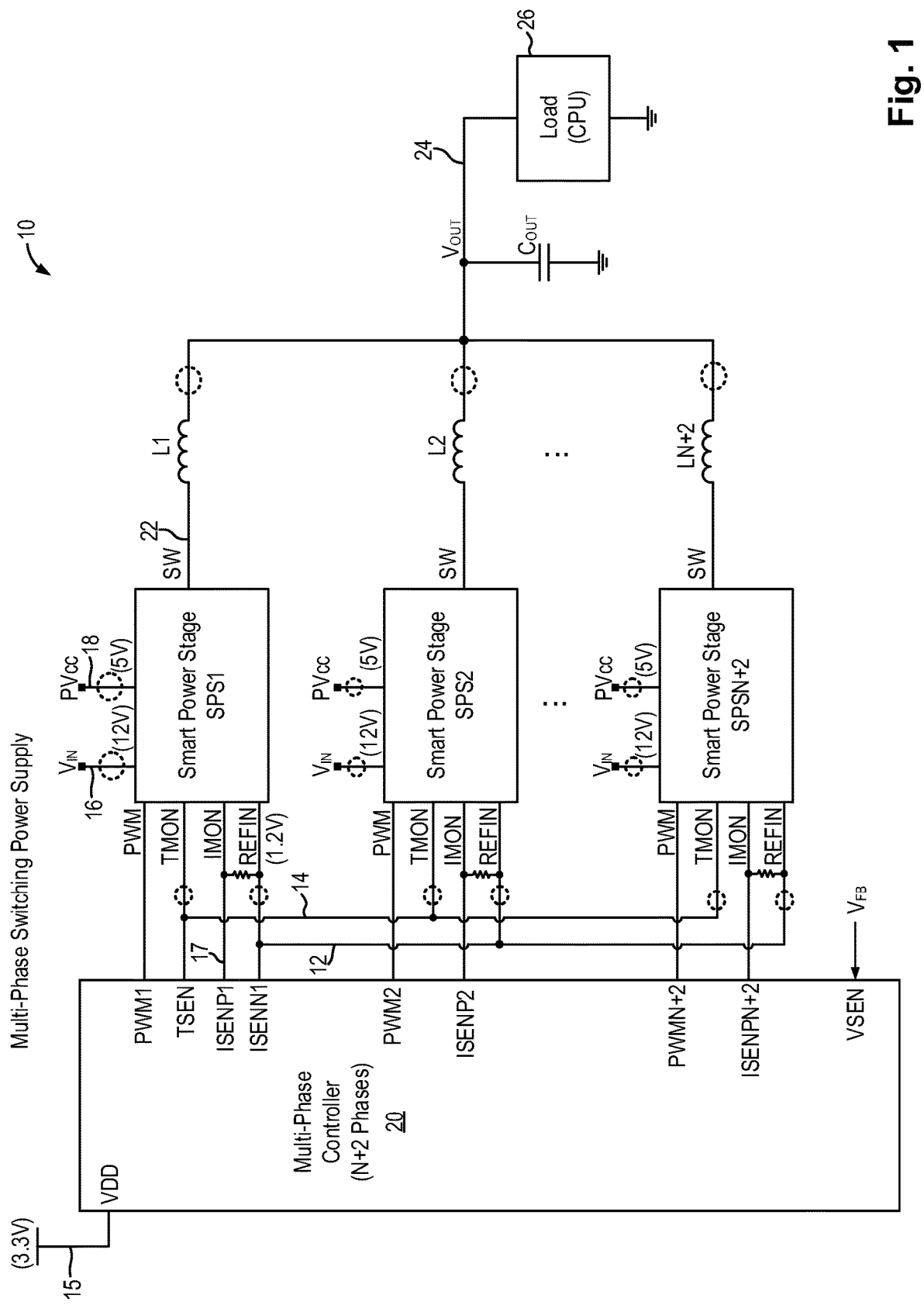
FIG. 1 is a schematic diagram of a multi-phase switching power supply implementing phase redundant scheme in which the current sensing circuit and method of the present invention can be implemented in embodiments of the present disclosure.

FIG. 1 is a schematic diagram of a multi-phase switching power supply implementing phase redundant scheme in which the current sensing circuit and method of the present disclosure can be implemented in embodiments of the present disclosure. Referring to FIG. 1, a multi-phase switching power supply 10 ("power supply 10") receives an input voltage $V_{IN}$ (node 16) and generates a regulated output voltage $V_{OUT}$ on an output node 24 for supplying a load 26. For example, the input voltage Vs may be a 12V input voltage and the regulated output voltage $V_{OUT}$ may be a 1.8V output voltage for driving a load, such as a CPU in a server system. The multi-phase switching power supply 10 also receives other power supply voltages for powering the support circuitry in the power supply circuit. For example, a power supply VDD (e.g. 3.3V) (node 15) is provided to power the controller circuit and a power supply PVcc (e.g. 5V) (node 18) is provided to power the driver circuitry in the power stage. The multi-phase switching power supply 10 is capable of delivering a regulated output voltage with high precision over a wide range of load conditions.

In embodiments of the present disclosure, the multi-phase switching power supply 10 implements phase redundant scheme and includes one or more redundant phases (or power stages) in addition to the power stages needed for meeting the current demand. In the present embodiment, the power supply 10 includes two redundant power stages and the power supply 10 is also referred to as an N+2 phase power supply, where N refers to the number of power stages needed to meet current demand by the load and 2 refers to the extra power stages for redundancy. Two redundant power stages offer high level of fail-safe protection because the probability of two power stages failing in a power supply is very low. In the present embodiment, the N+2 phase power supply 10 includes a multi-phase controller 20 capable of driving the N+2 power stages. The multi-phase controller 20 is sometimes referred to as an N+2 phase controller. The multi-phase controller 20 is coupled to drive the N+2 power stages SPS1 to SPSN+2 with associated output inductors L1 to LN+2 and an output capacitor $C_{OUT}$. In the present embodiment, the power stages are implemented as smart power stages having capabilities to report certain operating parameters (such as sensed temperature) to the controller 20. The use of smart power stages is illustrative only and not intended to be limiting. In other embodiments, the switching power supply 10 can be implemented using power stages including power switches and driver circuits only, without the capability of reporting operating parameters.

In one example, the load 26, such as a CPU, may have a current demand of 250 A. The 250 A current can be supplied using an 8-phase switching power supply. When implementing a phase redundant scheme, the switching power supply is implemented as a 10-phase switching power supply including 8 minimum phases plus 2 extra phases to meet load current demand.

In operation, the N+2 power stages of the power supply 10 are activated to supply the load current demand. If any of the N+2 power stages SPS1 to SPSN+2 fails, the failed power stage is isolated and disconnected from the other power stages. The remaining N+1 power stages continue operation uninterrupted. The current demand is distributed over the remaining power stages so that the switching power supply 10 operates without interruption. If a second power stage fails, the power supply 10 can still continue to operate to meet the current demand using the remaining minimum number of phases. In particular, the N+2 power stages are switchably connected to a set of shared signals. If a power stage fails, the failed power stage is disconnected from all of the shared signals so that the remaining power stages continue to provide uninterrupted power. In some cases, the controller 20 may issue an alert to a host system regarding the failed power stage.

More specifically, the power supply 10 includes power stages SPS1 to SPSN+2 driven by respective PWM signals PWM1 to PWMN+2. Each power stage SPSx includes a pair of power switches which are turned on and off by the respective PWM signal to regulate the output voltage $V_{OUT}$ with reference to a target voltage. The power switches in each power stage SPSx are alternately turned on and off to generate a switching output voltage SW at a switching output node 22. The switching output node 22 for each power stage SPSx is coupled to respective output inductor Lx. The inductors Lx of all the power stages are coupled to the output capacitor $C_{OUT}$ to form the LC filter circuit for providing current to the output node 24 while maintaining a substantially constant output voltage $V_{OUT}$. The output voltage $V_{OUT}$ can then be used to drive the load 26.

The multi-phase controller 20 receives a feedback voltage $V_{FB}$ indicative of the regulated output voltage $V_{OUT}$ at the load 26. In some examples, the feedback voltage $V_{FB}$ can be the voltage driving the load 26 or a stepped down voltage of the output voltage $V_{OUT}$. The multi-phase controller 20 includes circuitry to implement the feedback control loop of the switching power supply 10 to generate the multi-phase PWM signals PWM1 to PWMN+2 to drive the respective power stages SPSx in the multi-phase power supply 10.

In embodiments of the present disclosure, each power stage SPSx receives the respective PWMx signal from the controller 20 to control the switching of the power switches in the power stage. The power stage SPSx may also be configured to measure the temperature local to the power stage and provide a temperature sense signal TMON to the controller. In the present example, the temperature sense signals TMON of all the power stages SPS1 to SPSN+2 are connected together and provided to the controller 20 to be monitored collectively as a signal TSEN. For example, the power stage with highest junction temperature acts as a master. In the present illustration, the power stage SPSx may also be configured to measure the phase current being provided by the power stage. The phase current at each power stage is measured as a signal IMON and is reported to the controller 20 as a current sense signal ISENPx. In some examples, the signal IMON is a differential signal referenced to a reference voltage REFIN supplied by the controller 20 as the sense signal ISENNx. In one example, the reference voltage REFIN is 1.2V.

The power stages SPS1 to SPSN+2 are switchably connected to a set of shared signals. In particular, the shared signals include: the input voltage $V_{IN}$ (node 16) (e.g. 12V), the gate driver voltage PVcc (e.g. 5V), the output voltage $V_{OUT}$ (node 24), the reference voltage REFIN (node 12) and the temperatures sense signal TMON (node 14). In operation, the N+2 power stages are connected together to the shared signals. A failed power stage is disconnected from the power supply by disconnecting from the shared signals.

As thus configured, each power stage SPSx is connected to the shared signals through a set of switches or transistors. In some embodiments, each power stage is connected to the input voltage $V_{IN}$ and the output voltage $V_{OUT}$ through disconnect transistors implemented as power field-effect transistors (FETs) because of the high voltage and/or high current requirement. In the embodiments of the present disclosure, an input voltage disconnect transistor connects the input voltage $V_{IN}$ to the power switches in each power stage. The input voltage disconnect transistor is also referred to as an E-Fuse or an input voltage disconnect FET. Furthermore, an output voltage disconnect transistor connects the output inductor to the output voltage node in each power stage. The output voltage disconnect transistor is also referred to as an ORing FET or an output voltage disconnect FET. The power stage is connected to the other shared signals (PVcc, TMON, REFIN) through disconnect switches or transistors that can be implemented as field-effect transistors but are not necessarily power transistors. The disconnect switches/transistors are not shown in FIG. 1 for simplicity but it is understood that each power stage SPSx is switchably connected to the shared signals as indicated by the dotted circle in FIG. 1.

In operation, the controller 20 in power supply 10 needs to accurately measure the output current or the phase current provided by each power stage SPSx. For instance, the phase current provided by each power stage is monitored in order to perform load balancing across the power stages. Load balancing is important to optimize the thermal performance of the power supply 10 to avoid the situation when one power stage conducts a much larger share of the load current as compared to the other power stages. In another example, the host system operating the load often need to have an accurate measurement of the load current being supplied to the load to determine if load operation needs to be adjusted. For example, in the case the load is a CPU, the host system may determine based on the load current consumption, and other factors, whether to use overclock mode or not. Finally, in some cases, the load may be operating based on a load line and the controller 20 needs the load current information to determine how much adjustment to the output voltage $V_{OUT}$ is needed as a function of the load current being conducted.

Figure 2:
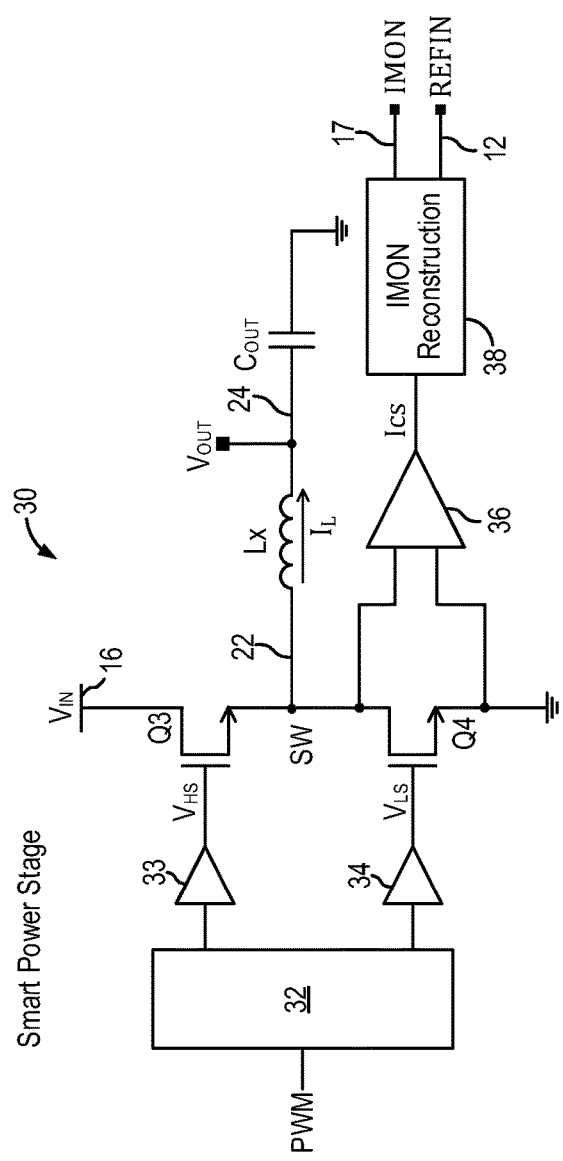
FIG. 2 is a circuit diagram illustrating a method for measuring the phase current by sensing the On-Resistance of the low-side power switch in some examples.
Figure 3:
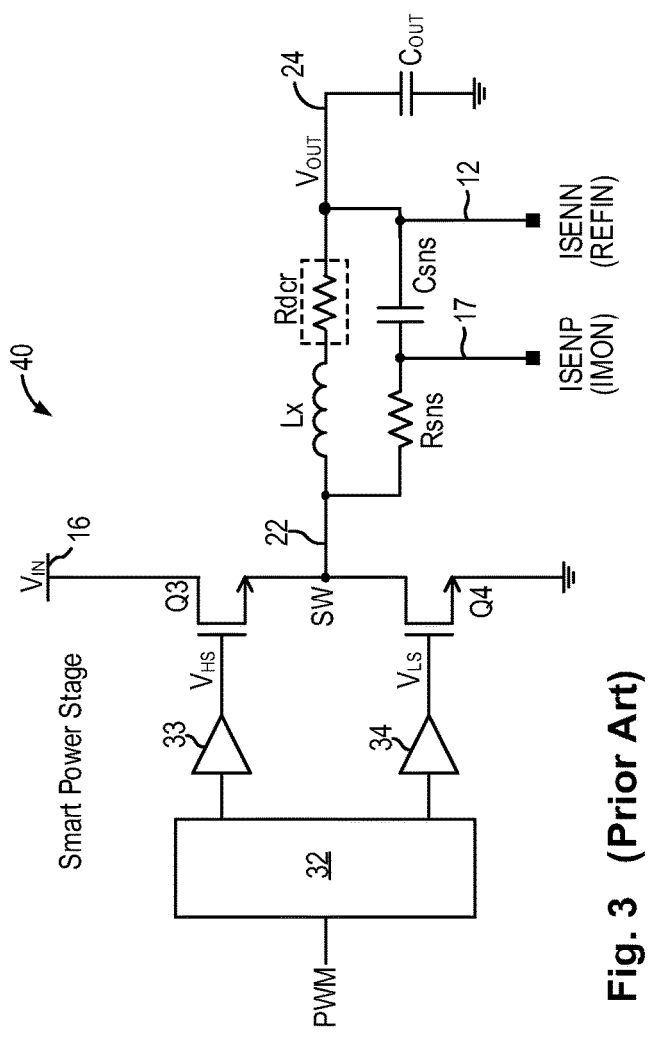
FIG. 3 is a circuit diagram illustrating a method for measuring the phase current by sensing the DC resistance (DCR) of the output inductor in some examples.

FIGS. 2 and 3 are circuit diagrams illustrating methods for measuring the phase current at a power stage in some examples. FIG. 2 is a circuit diagram illustrating a method for measuring the phase current by sensing the On-Resistance of the low-side power switch in some examples. FIG. 3 is a circuit diagram illustrating a method for measuring the phase current by sensing the DC resistance (DCR) of the output inductor in some examples. FIGS. 2 and 3 illustrate the basic power stage circuit for receiving the PWM signal and generating the switching output signal SW and the output voltage $V_{OUT}$ at the LC filter including the output inductor Lx and the output capacitor $C_{OUT}$. Like elements in FIG. 1-3 are given like reference numerals to simplify the discussion.

Referring first to FIG. 2, a power stage 30 includes driver logic circuit 32 receiving the PWM signal and providing the gate drive signals to respective gate drivers 33 and 34. The gate drivers 33 and 34 are coupled to drive respective power switches Q3 and Q4. Power switches Q3 and Q4, referred to as the high-side power switch and the low-side power switch respectively, are connected in series between the input voltage $V_{IN}$ and the ground reference voltage. In the present embodiment, power switches Q3 and Q4 are NMOS transistors, or N-type MOSFET transistors. Power switch Q3 is turned on by the high-side gate drive signal $V_{HS}$ to conduct a current to charge inductor Lx during the on duration of the PWM duty cycle. Power switch Q4 is turned on by the low-side gate drive signal $V_{LS}$ to conduct a current to discharge inductor Lx during the off duration of the PWM duty cycle.

Figure 4:
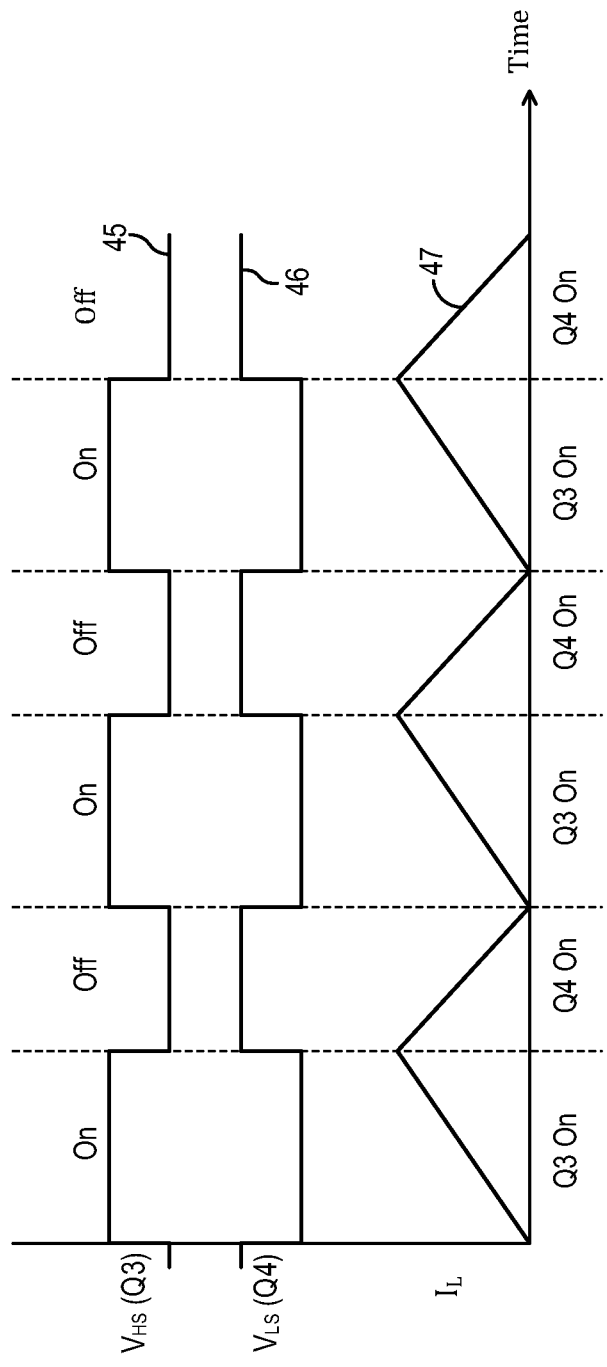
FIG. 4 is a plot illustrating the inductor current waveform in response to the switching action of the power switches in some examples.

FIG. 4 is a plot illustrating the inductor current waveform in response to the switching action of the power switches in some examples. Referring to FIG. 4, the high-side gate drive signal $V_{HS}$ (curve 45) controlling the high-side power switch Q3 switches on and off in response to the PWM signal provided to the power stage. Meanwhile, the low-side gate drive signal $V_{LS}$ (curve 46) controlling the low-side power switch Q4 switches off and on in response to the PWM signal and in opposite phase to the power switch Q3. That is, power switches Q3 and Q4 are turned on and off alternately. As a result, the inductor Lx is charged and discharged by the on-off action of power switches Q3 and Q4 and the inductor current $I_L$ (curve 47) assumes a sawtooth waveform. The inductor current $I_L$ has an upslope during the charging phase when power switch Q3 is turned on and the inductor current $I_L$ has a downslope during the charging phase when power switch Q4 is turned on. The inductor current is coupled to the output capacitor $C_{OUT}$ to charge and discharge the output capacitor. The inductor current flowing to the output capacitor $C_{OUT}$ is indicative of the phase current of the power stage.

One method commonly used for measuring the phase current at the power stage is low-side current sensing, as illustrated in FIG. 2. Low-side current sensing measures the current at the low-side power switch Q4. In other words, the downslope inductor current is measured and the upslope inductor current is estimated to obtain the total inductor current at the power stage. In one example, the current flowing through the low-side power switch Q4 is measured by sensing the drain-to-source voltage across power switch Q4, such as using a sense amplifier 36. The sensed current Ics is indicative of the current flowing in the low-side power switch Q4, corresponding to the downslope of the inductor current $I_L$ in FIG. 4. The sensed current Ics is then provided to an IMON Reconstruction circuit 38 to estimate the upslope inductor current and to generate the estimated total inductor current IMON (node 17). The estimated total inductor current IMON can be provided by the power stage to the controller, such as controller 20, to perform management functions, such as load balancing or current monitoring. In some cases, the inductor current signal IMON is a differential signal and is referenced to the reference voltage REFIN (node 12).

Sensing the inductor current at the low-side power switch Q4 has some disadvantages. Because the current Ics is sensed by measuring the On resistance (RDSON) of the transistor Q4, the current Ics tends to vary with the junction temperature of transistor Q4. To ensure accuracy, temperature compensation has to be implemented to account for the RDSON variation. Furthermore, the low-side sensing method estimates the upslope inductor current. The upslope inductor current is estimated as:

$$I_L(\text{upslope}) = \frac{V_L * di}{L},$$

where $V_L$ denotes the voltage across the inductor, di denotes the change in inductor current and L denotes the inductance of the output inductor Lx.

The upslope inductor current is a function of the inductance of the output inductor Lx. When the inductance varies, the upslope ramp rate will vary as well. In practice, the inductance value is not constant across all current value. At high inductor current, the inductance may decrease. Thus, the IMON reconstruction circuit 38 will need to account for the inductance variation as well as the RDSON variation. As a result, the low-side current sensing method has limited accuracy.

Another method for measuring the phase current at the power stage is inductor DCR (DC resistance) current sensing, as illustrated in FIG. 3. That is, the phase current of the power stage is measured by measuring the current flow through the inductor Lx using the DC resistance of the inductor, denoted as Rdcr in FIG. 3. A filter circuit including a resistor Rsns and a capacitor Csns are connected in series with the inductor Lx to match the time constant of the inductor Lx with the DC resistance. The current is measured across capacitor $C_{SNS}$. Inductor DCR current sensing suffers from temperature variations and therefore requires temperature compensation to improve accuracy.

In embodiments of the present disclosure, a circuit and method in a multi-phase power supply for measuring the phase current in a power stage uses a current sense transistor that is coupled in series with the output inductor to sense the phase current at the power stage. Furthermore, in some embodiments, the current sense transistor mirrors the output voltage disconnect transistor, or the ORing FET, incorporated in the power stage to disconnect the power stage from the output voltage node under the phase redundant scheme. In this manner, accurate current sensing can be performed at the power stage using a simple circuit.

Figure 5:
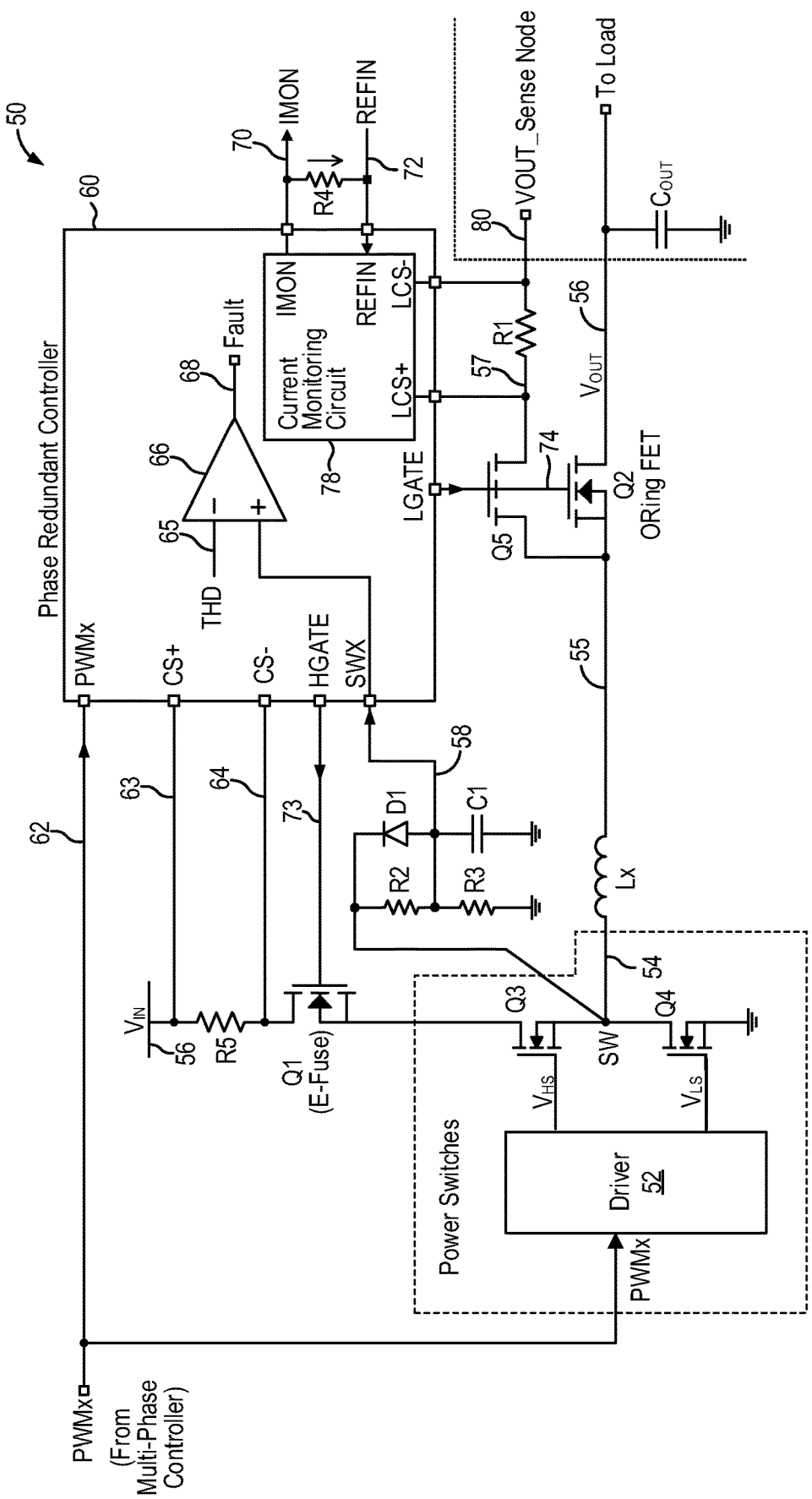
FIG. 5 is a schematic diagram of a power stage in a multi-phase switching power supply implementing phase current sensing using a current sense transistor in embodiments of the present disclosure.

FIG. 5 is a schematic diagram of a power stage in a multi-phase switching power supply implementing phase current sensing using a current sense transistor in embodiments of the present disclosure. The power stage 50 of FIG. 5 can be used to implement each of the power stages SPS1 to SPSN+2 in FIG. 1 in embodiments of the present disclosure. That is, the power stage 50 of FIG. 5 can be used to implement each phase of the multi-phase switching power supply 10 of FIG. 1.

Referring to FIG. 5, a power stage 50 includes power switches Q3 and Q4 driven by a driver circuit 52, a phase redundant controller (PRC) 60, an input voltage disconnect transistor Q1 (E-Fuse) and an output voltage disconnect transistor Q2 (ORing FET), and an output inductor Lx. The power stage 50 implements one phase of the multi-phase switching power supply and the output node 56 of the power stage 50 is connected to the output voltage node of the multi-phase switching power supply to be connected with the output nodes of the power stages of the other phases and to the output capacitor $C_{OUT}$. The output voltage node of the multi-phase switching power supply is then coupled to drive a load.

The power stage 50 receives a PWM signal PWMx (node 62) from the multi-phase controller (such as multi-phase controller 20 of FIG. 1). The PWM signal PWMx is associated with the phase the power stage is implementing. The driver circuit 52 receives the PWMx signal and generating the high-side drive signal $V_{HS}$ to drive the high-side power switch Q3 and the low-side gate drive signal $V_{LS}$ to drive the low-side power switch Q4. The power switches Q3 and Q4 are alternately turned on and off to generate the switching output voltage SW (node 54) which is coupled to the LC filter formed by the output inductor Lx and the output capacitor COUT to generate the output voltage $V_{OUT}$ on the output node 56. As described above and illustrated in FIG. 4, the power switch Q3 is turned on by the high-side gate drive signal $V_{HS}$ to conduct a current to charge inductor Lx during the on duration of the PWM duty cycle. Power switch Q4 is turned on by the low-side gate drive signal $V_{LS}$ to conduct a current to discharge inductor Lx during the off duration of the PWM duty cycle.

When power stage 50 is implemented into a multi-phase switching power supply, the power stage 50 is switchably connected to a set of shared signals with the other power stages, as described above with reference to FIG. 1. Disconnect switches or transistors are used to connect each power stage to the shared signals so that a respective power stage can be disconnected from the shared signals when the power stage fails. In the embodiment shown in FIG. 1, each power stage is switchably connected to five shared signals: $V_{IN}$, $V_{OUT}$, PVcc, TMON and REFIN. In FIG. 5, to simplify the discussion, the power stage 50 is shown connecting to the shared signals $V_{IN}$ and $V_{OUT}$ only. The other shared signals are omitted for simplicity but it is understood that the power stage 50 includes connections to all of the shared signals in the multi-phase switching power supply.

In embodiments of the present disclosure, the power stage 50 is switchably connected to the input voltage $V_{IN}$ (node 56) through an input voltage disconnect transistor Q1, also referred to as an E-Fuse. In the present embodiment, a resistor R5 is coupled between the E-Fuse (transistor Q1) and the input voltage $V_{IN}$ (node 56) to provide current sensing. Resistor R5 is optional and may be omitted in other embodiments. In other embodiments, current sensing can be performed at transistor Q1 instead of using resistor R5. The power stage 50 is also switchably connected to the output node 56 through an output voltage disconnect transistor Q2, also referred to as an ORing FET. In particular, the ORing FET (transistor Q2) is connected in series with the output inductor Lx of the power stage. In other words, the transistor Q2 is connected between a terminal (node 55) of the output inductor Lx and the output node 56.

The input voltage disconnect transistor Q1 (E-Fuse) is controlled by a control signal HGATE (node 73) provided by the phase redundant controller 60. The output voltage disconnect transistor Q2 (ORing FET) is controlled by a control signal LGATE provided by the phase redundant controller 60. In normal operation, the control signals HGATE and LGATE are asserted to close the disconnect transistors Q1 and Q2 and the power stage 50 is connected to the input voltage $V_{IN}$ and to the output node 56. In the event that a fault condition is detected in the power stage 50, the phase redundant controller 60 will deassert the control signals HGATE and LGATE and the disconnect transistors Q1 and Q2 will be open to disconnect the power stage 50 from the input voltage $V_{IN}$ and the output voltage $V_{OUT}$. It is instructive to note that the power stage 50 includes other disconnect switches or transistors to disconnect the power stage from the other shared signals. The other disconnect switches/transistors are not shown in FIG. 5 to simplify the discussion. Through the use of the disconnect transistors, a failed power stage can be disconnected from the multi-phase switching power supply to enable the power supply to maintain uninterrupted power supply operation using the remaining power stages.

In some examples, for the case where the power switch Q3 is shorted, the power stage 50 can detect the failure in two ways. If the driver circuit 52 and the power switch Q4 are still functioning, then the phase redundant controller 60 can sense current flow in resistor R5 when power switch Q4 is turned on, which is an abnormal condition, and the controller 60 can indicate a fault condition. Alternately, when either the driver circuit 52 or the power switch Q4 cannot be turned on, the switching output voltage SW on switch node 54 will become stuck high. This condition is detected by the filter circuit formed by resistors R2 and R3, capacitor C1 and diode D1. The filter circuit receives the switching output voltage SW and generates an output signal SWX (node 58) with a time constant determined by the resistance of resistors R2 and R3 and the capacitance of capacitor C1. The signal SWX is coupled to a comparator 66 to be compared with a voltage threshold THD (node 65). In the event the signal SWX increases above the voltage threshold THD, the comparator 66 asserts the output signal Fault (node 68) to indicate a fault condition. In particular, in normal operation, with the switching output voltage SW alternating between a high state and a low state based on the duty cycle of the PWMx signal, the signal SWX will be charged up but not to the voltage threshold THD before the signal SWX is discharged. However, when the switching output voltage SW is stuck high, the signal SWX will be charged up and eventually will exceed the voltage threshold THD. The comparator 66 will therefore assert the Fault signal. In response to the fault signal, the phase redundant controller 60 will deassert the HGATE and LGATE signals to open the E-Fuse and the ORing FET, thereby disconnecting the power stage 50 from the input voltage $V_{IN}$ and the output node 56. In this manner, the signal SWX, generated by the filter circuit of resistors R1, R3 and capacitor C1, is used to signal when the duty cycle of the switching output voltage SW has exceeded the maximum allowable duty cycle.

In other examples, for the case where the power switch Q4 is shorted, the power stage 50 can detect the failure in two ways. If the driver circuit 52 and the power switch Q3 are still functioning, then the phase redundant controller 60 can sense current flow in resistor R5 when power switch Q3 is turned on, which is an abnormal condition, and the controller 60 can issue a fault condition. Alternately, in the event power switch Q4 is shorted, current will discharge from the output node 56 through switch Q4 to ground. The phase redundant controller 60 is configured to detect such a negative current flowing in transistor Q2. In the event negative current is detected in transistor Q2, the phase redundant controller 60 will indicate a fault condition.

In embodiments of the present invention, the power switches Q3 and Q4 are MOSFET transistors and the disconnect transistors Q1 and Q2 are also MOSFET transistors. Furthermore, in one embodiment, transistors Q1, Q2, Q3 and Q4 are NMOS power transistors or N-type MOSFET transistors.

In embodiments of the present disclosure, current sensing at the power stage 50 is implemented using a current sense transistor Q5 that mirrors the output voltage disconnect transistor Q2 (the ORing FET) and has a size that is a fraction of the disconnect transistor Q2. In particular, current sense transistor Q5 has a transistor width that is a fraction of the transistor width of the disconnect transistor Q2 (the ORing FET). The current sense transistor Q5 is connected substantially in parallel with transistor Q2 and is controlled by the same control signal LGATE. More specifically, the current sense transistor Q5 is connected in series with the output inductor Lx and conducts a portion of the inductor current flowing from the inductor Lx to the output node 56. Because the ORing FET (transistor Q2) carries the entire inductor current—both the upslope and the downslope current, by using the mirror transistor Q5 to monitor the current at transistor Q2, the entire load current can be monitored.

In particular, the output inductor Lx has a first terminal (node 54) connected to the switching output voltage SW and a second terminal (node 55). The output voltage disconnect transistor Q2 has a first current terminal (e.g. source) connected to the second terminal (node 55) of the output inductor Lx, a second current terminal (e.g. drain) connected to the output node 56 providing the output voltage, and a control terminal coupled to receive the control signal LGATE. The current sense transistor Q5 has a first current terminal (e.g. source) connected to the second terminal (node 55) of the output inductor Lx, a second current terminal (e.g. drain) (node 57), and a control terminal coupled to receive the control signal LGATE. The second current terminal (node 57) of current sense transistor Q5 is connected to a VOUT_Sense node 80 through a resistor R1. In the present description, VOUT_Sense node 80 is the point at the load where the output voltage $V_{OUT}$ is sensed. The output voltage $V_{OUT}$ at the VOUT_Sense node 80 tends to have a lower voltage level than the output voltage $V_{OUT}$ at the source (node 56) of transistor Q2 which is the output node of the power stage. The current sense transistor Q5 has a size that is a fraction of the output voltage disconnect transistor Q2. As thus configured, the current sense transistor Q5 conducts a portion of the load current flowing through inductor Lx. The current flowing through current sense transistor Q5 is measured by resistor R1. In the present embodiment, the voltage across resistor R1 is measured by the phase redundant controller 60 to indicate the current flow through current sense transistor Q5. For instance, voltages LCS+ and LCS− across the resistor R1 are measured by phase redundant controller 60 and are indicative of the current being conducted through current sense transistor Q5. The phase redundant controller 60 includes a current monitoring circuit 78 which receives the voltages LCS+ and LCS− and generates the current monitor signal IMON (node 70) referenced to the reference voltage REFIN (node 72). In some embodiments, the controller 60 converts the LCS+ and LCS− signals to a current signal at 5 µA/A gain. That is, with 1 kΩ sense resistor R4 at IMON pin connected to the reference voltage REFIN, a voltage signal at 5 mV/A can be provided as the IMON signal. The IMON signal and the REFIN signal can then be provided directly to multi-phase controller, such as multi-phase controller 20 of FIG. 1.

In some embodiments, the ORing FET (transistor Q2) is a MOS transistor and the current sense transistor Q5 is a mirror MOS transistor having a size that is a fraction of the switch Q2. That is, the transistors Q2 and Q5 has the same transistor channel length and the current sense transistor Q5 has a transistor channel width that is a fraction of the transistor channel width of the transistor Q2 (the ORing FET). In some embodiments, the ORing FET (transistor Q2) and the current sense transistor Q5 have a size ratio (or width ratio) of 1000:1, 5000:1, or 10,000:1. The size ratio can be selected to determine the amount of phase current to be conducted and dissipated through transistor Q5.

In some embodiments, transistors Q2 and Q5 are constructed using the same transistor structure. For example, transistor Q2 can be constructed as a trench MOS transistor and transistor Q5 is also constructed as a trench MOS transistor but having a fraction of the size. For example, the transistor Q2 may be constructed using a first number of trenches while the transistor Q5 may be constructed using a second number of trenches, the second number being a fraction of the first number.

In some embodiments, the resistor R1 is a precision resistor to provide high accuracy in current sensing. In some embodiment, transistors Q2 and Q5 are formed on the same integrated circuit die and resistor R1 is a discrete resistor formed outside the integrated circuit die. In other embodiments, resistor R1 can be a polysilicon resistor formed on the integrated circuit die. The resistance value of the poly resistor can be trimmed to obtain the desired accuracy.

The current sensing method of the present disclosure using a mirror current sense transistor provides significant accuracy advantages over conventional current sensing techniques. The mirror current sense transistor measures the entire inductor current waveform, both the upslope and the downslope. This provides particular advantage over the low-side sensing method where the load current is sensed only on the low-side power switch Q4 and the inductor upslope current has to be estimated. Furthermore, temperature compensation of the sensed current value is not needed because the current sense signal measured by the current sense transistor is temperature independent and inductance value independent. Since the entire inductor current is monitored in a real time, change in inductance value of the output inductor is included in the current sense measurement. No further compensation is required. The current sense transistor Q5 may need to be calibrated to the ORing FET (transistor Q2). But once calibrated, the current sense transistor Q5 mirrors the ORing FET (transistor Q2) and conducts a portion of the phase current for current sensing.

Figure 6:
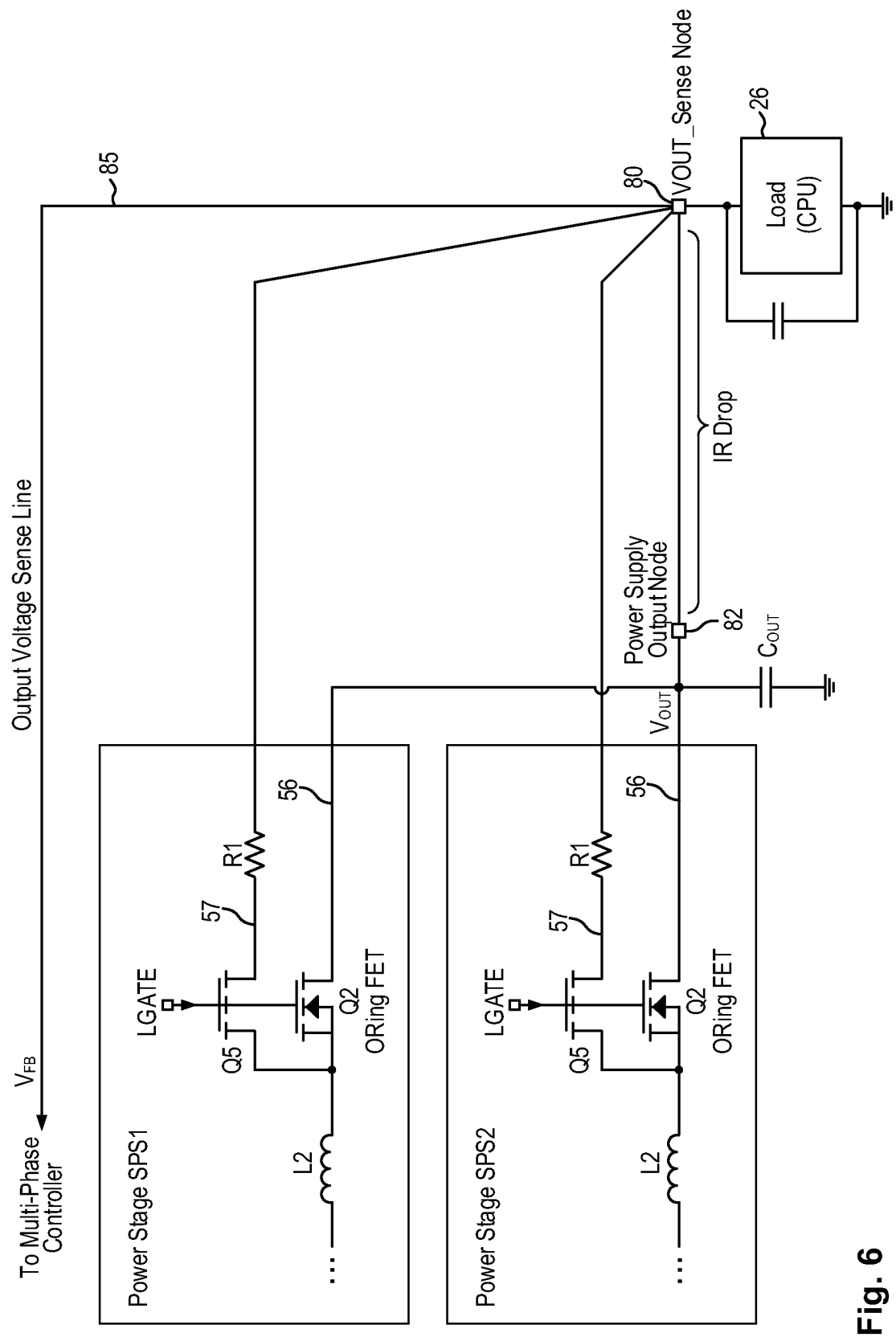
FIG. 6 is a schematic diagram illustrating the connection of the current sense transistor to the output voltage sense node in some embodiments.

As described above, the current sense transistor Q5 is connected to the VOUT_Sense node 80 through resistor R1. FIG. 6 is a schematic diagram illustrating the connection of the current sense transistor to the output voltage sense node in some embodiments. Referring to FIG. 6, the output nodes 56 of each power stage are connected together to the output voltage node 82 (also referred to as the power supply output node) of the multi-phase switching power supply. The output capacitor $C_{OUT}$ is connected to the power supply output node 82 to generate the output voltage $V_{OUT}$ of the multi-phase switching power supply. The output voltage $V_{OUT}$ is connected to drive a load 26, such as CPU. The connection or the conductive line that connects the output voltage $V_{OUT}$ to the load 26 has a certain IR voltage drop. Thus, the output voltage $V_{OUT}$ at the load 26 may be lower than the output voltage $V_{OUT}$ at the power supply output node 82. The output voltage at the load 26 is fed back to the multi-phase switching power supply to facilitate feedback control of the output voltage $V_{OUT}$. In particular, the feedback voltage $V_{FB}$ is measured at a VOUT_Sense node 80 at the load 26.

In embodiments of the present disclosure, the resistor R1 is connected between the current sense transistor Q5 and the VOUT_Sense node 80 at the load 26. In this manner, the voltage drop across resistor R1 is minimized while sufficient headroom is provided to sense the current flow in transistor Q5. In particular, in the multi-phase switching power supply, the resistor R1 or each power stage is connected to the VOUT_Sense node 80 in a fan-out configuration. The resistors R1 of the power stages do not connect to the sense line 85 that connects the VOUT_Sense node 80 to the feedback voltage $V_{FB}$ so as not to disturb the feedback voltage.

Figure 7B:
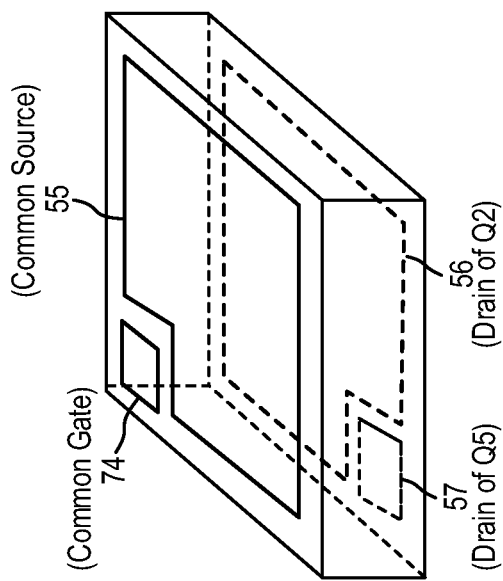
FIGS. 7(a) and 7(b), illustrates one method of forming the current sense transistor in conjunction with the ORing FET (the output voltage disconnect transistor) in some embodiments.
Figure 7A:
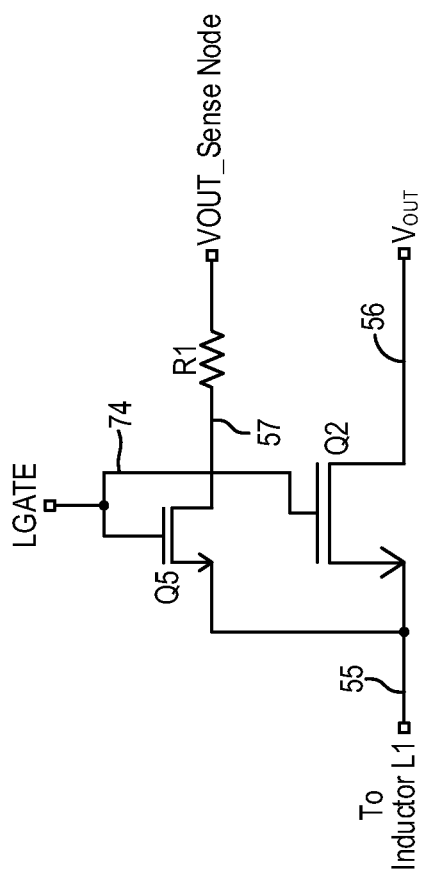

FIG. 7, which includes FIGS. 7(a) and 7(b), illustrates one method of forming the current sense transistor in conjunction with the ORing FET (the output voltage disconnect transistor) in some embodiments. Referring to FIG. 7(a), the ORing FET (transistor Q2) and the mirror current sense transistor Q5 are constructed as MOS transistors with a common source connection (node 55) and a common gate connection (node 74). In some embodiments, the ORing FET (transistor Q2) and the mirror current sense transistor Q5 are formed on the same integrated circuit die, as shown in FIG. 7(b). In other words, the ORing FET (transistor Q2) and the mirror current sense transistor Q5 are formed on the same semiconductor substrate. FIG. 7(b) illustrates one exemplary embodiment of the transistors Q2 and Q5 formed as vertical trench MOS transistors. In that case, transistors Q2 and Q5 can be formed using a common source (node 55) and a common gate connection (node 74). Transistor Q2 is formed using majority of the trench cells on the die while transistor Q5 is formed using a small portion or small fraction of the trench cells on the same die. The drain connection pad of transistor Q2 (node 56) thus occupies majority of the trench cells while the drain connection pad of transistor Q5 (node 57) occupies only a small portion of the trench cells. In this manner, both transistor Q2 and transistor Q5 are formed on the same integrated circuit die, both experience the same temperature excursions. Transistor Q5 can thus realize high accuracy in current sensing. The trench transistor structure of FIG. 7 is illustrative only and not intended to be limiting. In other embodiments, transistors Q2 and Q5 can be implemented using a lateral DMOS (LDMOS) process.

Figure 8:
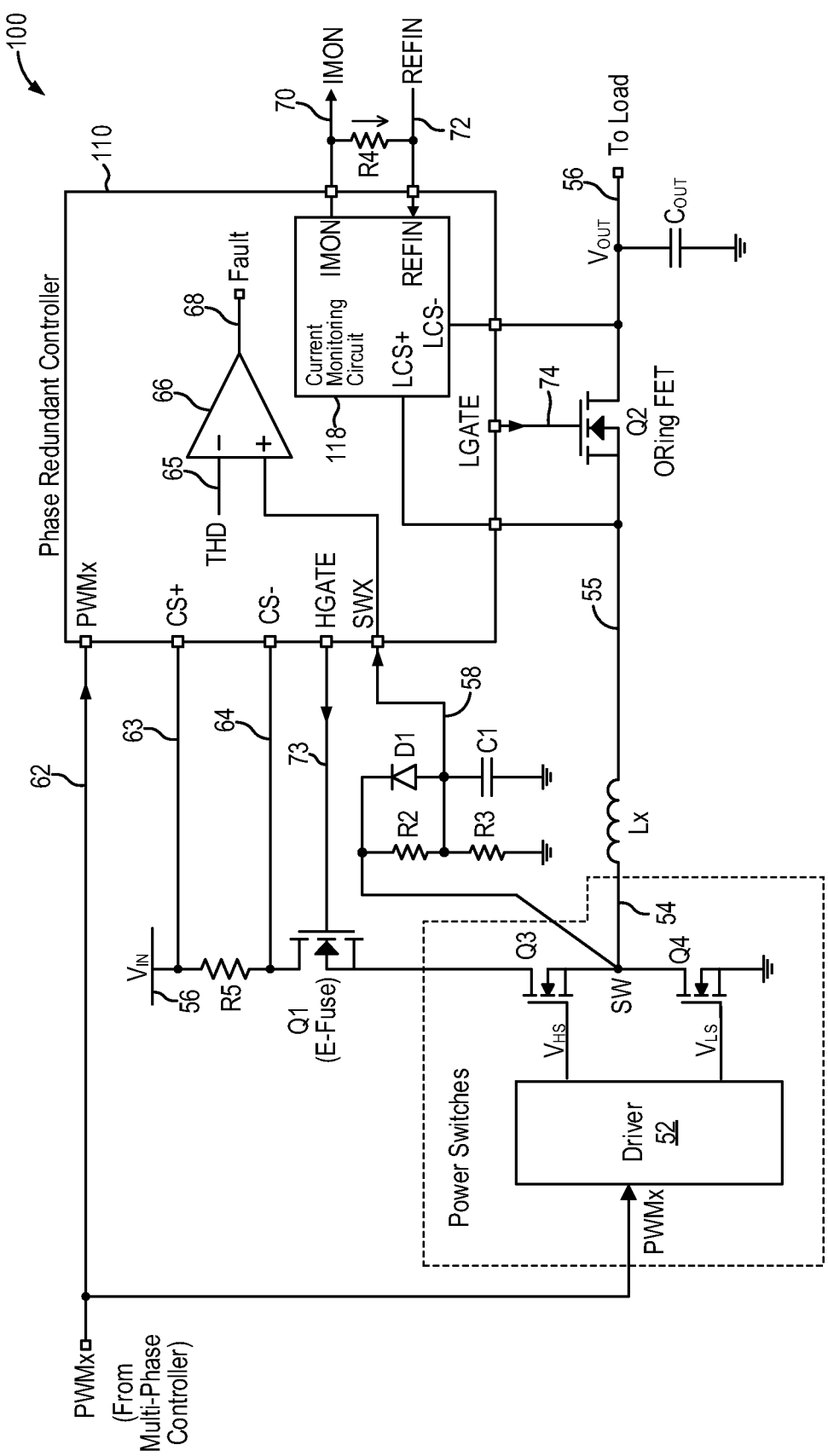
FIG. 8 is a schematic diagram of a power stage in a multi-phase switching power supply implementing phase current sensing at the ORing FET in embodiments of the present disclosure.

FIG. 8 is a schematic diagram of a power stage in a multi-phase switching power supply implementing phase current sensing at the ORing FET in embodiments of the present disclosure. A power stage 100 of FIG. 8 is constructed in a similar manner to the power stage 50 of FIG. 5 and like elements are given like reference numeral and will not be further described. Referring to FIG. 8, the power stage 100 implements phase current sensing by measuring the On resistance of the ORing FET (transistor Q2). In this manner, no additional mirror transistor needs to be provided. The On resistance (RDSON) of transistor Q2 can be measured by measuring the voltage across the source (node 55) and the drain (node 56) of the transistor Q2. In the present embodiment, voltages LCS+ and LCS− across the ORing FET (transistor Q2) are measured by phase redundant controller 110 and are indicative of the inductor current flowing through the ORing FET. The phase redundant controller 110 includes a current monitoring circuit 118 which receives the voltages LCS+ and LCS− and generates the current monitor signal IMON (node 70) referenced to the reference voltage REFIN (node 72). The IMON signal and the REFIN signal can then be provided directly to multi-phase controller, such as multi-phase controller 20 of FIG. 1. In embodiments of the present disclosure, the On resistance (RDSON) of transistor Q2 may have certain variation as a function of the junction temperature of the transistor. To improve the accuracy of the current sensing, the current monitoring circuit 118 implements temperature compensation to correct for RDSON variation as a function of temperature. In one example, the current monitoring circuit 118 applies temperature compensation based on the measured die temperature of the integrated circuit die on which the transistor Q2 is implemented. In one embodiment, temperature compensation can be provided by co-packaging transistor Q2 with the phase redundant controller die in a multi-die package, which can provide thermal coupling needed to correct for the RDSON variation over temperature. A temperature sensor can be implemented on the phase redundant controller integrated circuit.

The invention can be implemented in numerous ways, including as a process; an apparatus; a system; a composition of matter; a computer program product embodied on a computer readable storage medium; and/or a processor, such as a hardware processor or a processor device configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided above along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The above detailed descriptions are provided to illustrate specific embodiments of the present invention and are not intended to be limiting. Numerous modifications and variations within the scope of the present invention are possible. The present invention is defined by the appended claims.

What is claimed is:

1. A power stage in a multi-phase switching power supply receiving a pulse width modulation (PWM) signal associated with a phase of the power stage and an input voltage and providing an output voltage, the power stage comprising:
   a high-side power switch and a low-side power switch connected in series between an input voltage node and a ground reference voltage and controlled by the PWM signal, a switch output node between current terminals of the high-side power switch and the low-side power switch generating a switching output voltage, the switch output node being coupled to a first terminal of an output inductor;
   a phase redundant controller receiving the PWM signal and generating a first control signal;
   an output voltage disconnect transistor coupled between a second terminal of the output inductor and an output node providing the output voltage, the output voltage disconnect transistor receiving the first control signal from the phase redundant controller, wherein the first control signal has a first state to close the output voltage disconnect transistor to connect the output inductor to the output node and a second state to open the output voltage disconnect transistor to disconnect the output inductor from the output node; and
   a current sense transistor having a first current terminal coupled to the second terminal of the output inductor and a second current terminal coupled to a first node through a sense resistor, and a control terminal receiving the first control signal, the current sense transistor having the same transistor structure as the output voltage disconnect transistor and having a size being a fraction of the output voltage disconnect transistor,
   wherein the current sense transistor is turned on by the first control signal to conduct a portion of an inductor current flowing in the output inductor of the power stage, and the phase redundant controller receives a current sense voltage signal measured across the sense resistor to generate a sense current signal indicative of the inductor current.

2. The power stage of claim 1, further comprising:
   an input voltage disconnect transistor coupled between the input voltage node and the input voltage, the input voltage disconnect transistor receiving a second control signal generated by the phase redundant controller, wherein the second control signal has a first state to close the input voltage disconnect transistor to connect the high-side power switch to the input voltage and a second state to open the input voltage disconnect transistor to disconnect the high-side power switch from the input voltage.

3. The power stage of claim 1, wherein the output voltage disconnect transistor comprises a MOS transistor and the current sense transistor comprises a MOS transistor constructed using a same transistor structure as the output voltage disconnect transistor and having a transistor channel width being a fraction of a transistor channel width of the output voltage disconnect transistor.

4. The power stage of claim 3, wherein the output voltage disconnect transistor and the current sense transistor are formed on a same semiconductor substrate.

5. The power stage of claim 4, wherein the output voltage disconnect transistor comprises a trench MOS transistor formed in a first plurality of trench cells and the current sense transistor comprises a trench MOS transistor formed in a second plurality of trench cells, the second plurality of trench cells being a fraction of the first plurality of trench cells.

6. The power stage of claim 5, wherein the sense resistor is a discrete resistor provided outside of the semiconductor substrate.

7. The power stage of claim 1, wherein the current sense transistor has a transistor channel width being $1/1000$ to $1/10{,}000$ of a transistor channel width of the output voltage disconnect transistor.

8. The power stage of claim 1, wherein the output node of the power stage is coupled to an output capacitor of the multi-phase switching power supply to form an LC filter circuit with the output inductor in response to the output voltage disconnect transistor being closed to generate a regulated output voltage having a substantially constant magnitude at an output voltage node of the multi-phase switching power supply, the regulated output voltage being coupled to drive a load, wherein the first node comprises a node at the load for sensing the regulated output voltage provided to the load.

9. A method in a power stage of a multi-phase switching power supply receiving a pulse width modulation (PWM)

signal associated with a phase of the power stage and an input voltage and providing an output voltage, the method comprising:

provided the current sense transistor having a transistor channel width being $1/1000$ to $1/10,000$ of a transistor channel width of the output voltage disconnect transistor.

generating, at the power stage, a switching output voltage from the input voltage in response to the PWM signal and coupling the switching output voltage to a first terminal of an output inductor;

connecting an output voltage disconnect transistor controlled by a first control signal between a second terminal of the output inductor and an output node of the power stage providing the output voltage;

turning on the output voltage disconnect transistor in response to the first control signal to conduct an inductor current flowing in the output inductor in response to the switching output voltage;

connecting a current sense transistor controlled by the first control signal between the second terminal of the output inductor and a sense resistor, the sense resistor being connected between the current sense transistor and a first node;

conducting, at the current sense transistor, at least a portion of the inductor current flowing in the output inductor in response to the first control signal being asserted to turn on the current sense transistor and the output voltage disconnect transistor;

measuring, at the sense resistor, a current sense voltage signal indicative of a current flowing in the current sense transistor; and providing a sense current signal in response to the current sense voltage signal, the sense current signal being indicative of the inductor current.

10. The method of claim 9, further comprising:
connecting an input voltage disconnect transistor controlled by a second control signal between the input voltage and the power stage.

11. The method of claim 9, wherein connecting the current sense transistor comprises:
providing the current sense transistor having a size being a fraction of the output voltage disconnect transistor.

12. The method of claim 11, wherein connecting the current sense transistor comprises:
providing the current sense transistor having a transistor channel width being $1/1000$ to $1/10,000$ of a transistor channel width of the output voltage disconnect transistor.

13. The method of claim 9, wherein connecting the current sense transistor comprises:
providing the output voltage disconnect transistor and the current sense transistor as MOS transistors having a same transistor structure, the current sense transistor having a transistor channel width being a fraction of a transistor channel width of the output voltage disconnect transistor.

14. The method of claim 9, wherein connecting the current sense transistor comprises:
providing the output voltage disconnect transistor and the current sense transistor as trench MOS transistors having a same trench transistor structure, the output voltage disconnect transistor being formed in a first plurality of trench cells and the current sense transistor being formed in a second plurality of trench cells, the second plurality of trench cells being a fraction of the first plurality of trench cells.

15. The method of claim 14, wherein the output voltage disconnect transistor and the current sense transistor are formed on a same semiconductor substrate.

16. The method of claim 15, wherein the sense resistor is a discrete resistor provided outside of the semiconductor substrate.

17. The method of claim 9, further comprising:
coupling the output node of the power stage to an output capacitor to form an LC filter circuit to generate a regulated output voltage having a substantially constant magnitude at an output voltage node of the multi-phase switching power supply, the regulated output voltage being coupled to drive a load, wherein the first node comprises a node at the load for sensing the regulated output voltage provided to the load.

* * * * *